United States Patent
Lindemann

(10) Patent No.: US 9,991,708 B2
(45) Date of Patent: Jun. 5, 2018

(54) POWER SUPPLY

(71) Applicant: PR Electronics A/S, Rønde (DK)

(72) Inventor: Stig Alnøe Lindemann, Højbjerg (DK)

(73) Assignee: PR Electronics A/S, Ronde (DK)

( * ) Notice: Subject to any disclaimer, the term of this patent is extended or adjusted under 35 U.S.C. 154(b) by 242 days.

(21) Appl. No.: 14/898,169

(22) PCT Filed: Jun. 4, 2014

(86) PCT No.: PCT/DK2014/050158
§ 371 (c)(1),
(2) Date: Dec. 14, 2015

(87) PCT Pub. No.: WO2014/198276
PCT Pub. Date: Dec. 18, 2014

(65) Prior Publication Data
US 2016/0141872 A1    May 19, 2016

(30) Foreign Application Priority Data

Jun. 14, 2013  (DK) ................................. 2013 70317

(51) Int. Cl.
*H02J 1/10* (2006.01)
*H02J 3/38* (2006.01)
(Continued)

(52) U.S. Cl.
CPC .............. *H02J 3/005* (2013.01); *G05F 1/67* (2013.01); *H02J 3/10* (2013.01); *H02J 3/38* (2013.01); *H02M 3/33569* (2013.01)

(58) Field of Classification Search
CPC ......... H02M 3/33569; G05F 1/67; H02J 3/38; H02J 3/005; H02J 3/10
See application file for complete search history.

(56) References Cited

U.S. PATENT DOCUMENTS 4,742,291 A    5/1988  Bobier et al.
5,563,777 A *  10/1996  Miki ..................... H02M 1/425
                                                        315/224
(Continued)

FOREIGN PATENT DOCUMENTS

CN    101902065 A    12/2010
CN    102355003 A    2/2012
(Continued)

OTHER PUBLICATIONS

First Office Action in Corresponding European Patent Application No. 14 731 148.4 dated Apr. 10, 2017.

*Primary Examiner* — Jared Fureman
*Assistant Examiner* — Esayas Yeshaw
(74) *Attorney, Agent, or Firm* — David S. Safran

(57) ABSTRACT

A power supply and a method for operating the power supply in which a transformer connected to an excitation circuit which is adapted to be connected to a power source, which secondary winding is connected to at least one first power supply. From prior art. switch mode power supply based on fly back technology is well known. Here a power supply with a power inlet is provided with a plurality of separated power outlets. One of the lines connected to the primary winding is further connected to a discharge control circuit, which discharge control circuit is further connected to at least one second power supply and the primary winding is further connected to a discharge circuit where at least one further power supply is connected.

11 Claims, 4 Drawing Sheets

(51) Int. Cl.
  *H02J 3/00* (2006.01)
  *G05F 1/67* (2006.01)
  *H02M 3/335* (2006.01)
  *H02J 3/10* (2006.01)

(56) References Cited

U.S. PATENT DOCUMENTS

| | | | |
|---|---|---|---|
| 5,617,015 | A | 4/1997 | Goder et al. |
| 7,005,855 | B2 | 2/2006 | Zhu et al. |
| 7,564,706 | B1 * | 7/2009 | Herbert .................. G05F 1/70 323/222 |
| 7,622,820 | B1 | 11/2009 | Prodic et al. |
| 9,325,244 | B2 * | 4/2016 | Machi .................. H02M 3/335 |
| 9,490,707 | B2 * | 11/2016 | Karlsson ............ H02M 3/33576 |
| 2006/0220466 | A1 * | 10/2006 | Tahara .................. H02J 7/0018 307/65 |
| 2006/0244570 | A1 | 11/2006 | Leung et al. |
| 2009/0004981 | A1 | 1/2009 | Eliezer et al. |
| 2010/0133911 | A1 | 6/2010 | Williams et al. |
| 2010/0207455 | A1 | 8/2010 | Erickson, Jr. et al. |
| 2010/0207594 | A1 | 8/2010 | Davoudi et al. |
| 2010/0208501 | A1 | 8/2010 | Matan et al. |
| 2011/0234176 | A1 * | 9/2011 | Nakamura ............ H02M 1/08 320/166 |
| 2012/0260898 | A1 * | 10/2012 | Schremmer ............ F02P 3/06 123/598 |
| 2016/0248336 | A1 * | 8/2016 | Kamata ................ H02M 5/458 |

FOREIGN PATENT DOCUMENTS

| | | |
|---|---|---|
| CN | 202260483 U | 5/2012 |
| JP | H01-263806 A | 10/1989 |
| JP | 2008-135265 A | 6/2008 |
| WO | 2013/083296 A2 | 6/2013 |

* cited by examiner

POWER SUPPLY

BACKGROUND OF THE INVENTION

Field of the Invention

The present invention relates to a power supply and a method for operating the power supply comprising a transformer, which transformer comprises at least one primary winding and at least one secondary winding, which primary winding is connected by a first and a second line to at least one excitation circuit, which excitation circuit is adapted to be connected to a power source, which secondary winding is connected to at least one first power supply.

Description of Related Art

A switch mod power supply based on fly back technology well known.

SUMMARY OF THE INVENTION

It is an object of the present application to a power supply with a power inlet with a plurality of separated power outlets.

The object can be fulfilled by a power supply of the type initially mentioned which is modified so that one of the lines connected to the primary winding is further connected to a discharge control circuit, which discharge control circuit is further connected to at least one second power supply.

In this way, both a first power supply can be operated as a traditional fly-back power regulation where the output power is sent over the transformer, and, depending on the windings at primary or secondary change in voltage up or down is possible. This is the traditional way of operation, where a switch generates a current to the primary winding of the transformer, and this switch opens after the current and the magnetic field is generated, and the coil of the transformer continues conducting the current so the circuit probably comprises a free running diode. But in the meantime, the change of flux in the transformer will generate a further current in the secondary windings. This current will be an AC current because current in one direction is generated when the flux in the transformer is increasing, and in another direction when the flux is decreasing. By rectifying means it is possible to generate a DC power supply in the traditional fly-back manner. In the pending application the primary winding is further used because there is a further connection from the primary winding to a further discharge circuit where at least one further power supply is connected. The operation is that a switch is opened so that when the current generate the flux in the transformer, both lines towards the power supply are opened, and the current generated from the transformer now has to flow to the discharge circuit and into the second power supply. By controlling different switches it is possible to generate power at different power levels in the two power supplies. In the first power supply the power is passing the transformer and galvanic isolation is achieved towards the first power supply. The second power supply instead, is not galvanically isolated because electric connection from the primary winding of the transformer to the second power supply. With a relatively simple measurement of voltage in the power supply it is possible for a micro-control unit to control the activation of the switches, and in this way, by measuring the voltage; it will define which of the power supplies next use additional power.

The excitation circuit can comprise a first and a second electronic switch, which first and second electronic switch performs connection and disconnection of the power supply, which first and second switch is controlled by a first control signal. Hereby synchronous activation of the switches can be achieved. This synchronous activation is important both when connecting and disconnecting the power source. The synchronous switching is very important in situations where noise reduction is important. Especially if a product as the one disclosed in the pending application is used as a power supply for measuring systems, noise reduction is quite important.

The discharge control circuit can comprise at least an third electronic switch, which third electronic switch is connected to the second power supply, which third electronic switch is controlled by a second control signal. By controlling one or more further power supplies connected to the same discharge control unit, these different power supplies can operate independently of each other. They can be activated independently of each other because they have their own switch for activation in the discharge control circuit. Therefore regulation from further power supplies can be effected according to different parameters. In this way it is possible to let one power supply have a voltage control where another has a current control. Likewise one power supply can be feedback regulated where another can be forward regulated.

The discharge control circuit comprises at least an fourth electronic switch, which fourth electronic switch is connected to a third power supply, which fourth electronic switch is controlled by a third control signal. Hereby it can be achieved that the fourth switch can operate independently but still synchronously with the excitation circuit. In this way the switch can be operated only if there is a demand for further charging, for example of a capacitor in the power supply.

The first and the second control signal can be generated from at least a first processor. The use of a processor such as a microcontroller for generating the pulses means that the different pulses can be generated synchronously to each other but still with a defined timing in relation to each other. Depending on inputs to the microcontroller it is possible by efficient switching to achieve charging of the three independent power supplies in a way so that they are charged up to a level where they can supply with power to the level to which they are designed.

The first processor can be connected to measuring devices connected to the power supply, which measuring devices can transmit signals representing current and voltage at the power source. By measuring both current and voltage at the external power source it is possible in this way to obtain indication of any overload of the power supply. By a regulation algorithm it should be possible to influence the switching scheme, for example of the excitation circuit but also the activity of the discharge circuit and it may then be possible to reduce the power consumption for a short while. It could also be important not to start any excitation if the power that can be achieved by starting the cycle will be lower than the power level that already exists in the system. Therefore, it will be much better to keep the switches open and not to use any power from the power source.

The first processor can based on data representing voltage and current performs optimum power tracking to avoid over load of the power source. By power tracking a relatively efficient change in the load at the power source can be achieved. As soon as deviation in the voltage of the power source is indicated, the power tracking routine can change the excitation in such a way that the power consumption is being reduced long before the power source has reduced its voltage to a critical level.

The second power supply can be controlled for generating a mostly constant voltage. If the power supply is designed so that a measurement of the voltage is performed in the system, it is possible to control the voltage of the second power supply in such a way that this voltage can be kept very precise. This could be rather important if that power supply is used for the supply of processor means where the voltage for the operation should be kept above a minimum. Many other applications for power supply need to have a constant voltage at the output.

The third power supply can be controlled for generating a mostly constant power. In some situation, the third power supply can be used for backlight for an LCD display. This backlight does not necessarily need a constant voltage, but in order to have lighting fully effective, a certain minimum power level should be available. Therefore, a power regulation for this special use will be highly efficient. The power regulation is of course possible if the system as such has data on the voltage and the current.

The processor can be adapted for performing digital filtration of the power passing any of the switches in the discharge circuit. It is possible that the power level delivered from the second and the third power supplies is so low that it is possible to perform a digital filtration of the power signals. Therefore, the actual power can be sent through for example the microcontroller which can perform a digital filtration. By this digital filtration it is possible to reduce low frequency generated noise from the switching frequencies, simply because the microprocessor already knows the switching frequency it is highly efficient that information about the switching time could be used in controlling the digital filtration. The digital filtration can give a stabilized output voltage or output power. The stabilized output can thereby be achieved without using large capacitors. In this way the power supply as such can be produced in a very small size.

Input from the input voltage and the input current is controlling the PWM modulation, which PWM modulation is used for a lookup table for forward power regulation algorithm, which forward power algorithm generates a feed forward to the discharge control algorithm and to the discharge circuit. Because there is an input to the system from the input voltage and the input current, it is possible for the system to control the input power from the power source and by active influence of the excitation circuit the power consumption can be controlled. Further, by letting the PWM modulation be used for the lookup table and forward power regulation algorithm a feed forward to the discharge control and to the discharge circuit and the switches can be made. Hereby can an extremely fast regulation can be performed.

The present invention is also directed to a method for operating a power supply as disclosed previously, which method has at least the following sequence of steps:

A: connect the primary winding of the transformer to the power source,
B: disconnect the primary winding
C: let the secondary winding charge the first power supply
D: repeat connection of the primary winding to the power source
E: disconnect the primary winding ad close one of the switches in the discharge control circuit in order to charge the second ore the third power supply
F: Repeat the sequence from a-e in dependence of the actual power demand in the power supplies. By the method disclosed, it is possible to achieve an efficient power supply which power supply has an output at different power levels. At the first power supply it will be a power supply operating with galvanic isolation towards the rest of the system, but where the two other power supplies are connected to the primary side of the transformer. Hereby it can be achieved that the voltage generated at the first power supply has one level where voltage or power at the two other power supplies is highly different from the first power supply.

In the section above, an example was given with 2 fixed power regulation loops. A fixed power regulation could require: a voltage measurement, current measurement and a multiplication for each power regulation loop. Implementing one of the regulation loops as a forward regulation determined by the other power regulation loop would eliminate the need for carrying out two separate multiplications. This is an advantage if the CPU doesn't have native hardware multiplication support. To describe this regulation scheme in short:

One traditional power regulation loop is used to characterize the system
The characterization is used to create a secondary forward power regulation
If a fixed excitation time pulse is used for creating the forward power regulated supply, it is necessary to estimate the power of the pulse. The power of the fixed time excitation pulse depends on the applied voltage potential available from the external PSU.
The pulse power can be calculated in a CPU by using the following:
1. Feedback regulated loop keeps the total power consumption at a fixed level
    a. The total power consumption is the sum of:
        i. Power transferred during the PWM controlled excitation time slot
        ii. Power transferred during the fixed pulse length excitation time slot
    b. This regulation power level is controlled by the CPU by adjusting the PWM
2. The total power consumption regulation provides:
    a. a fixed pulse has a corresponding PWM value
3. The PWM value can be used to lookup the value of the fixed pulse in a pre-calculated lookup table
    a. Output value of lookup table can be used to create forward based power regulation by controlling the discharge circuit.

DETAILED DESCRIPTION OF THE INVENTION

Figure 1:
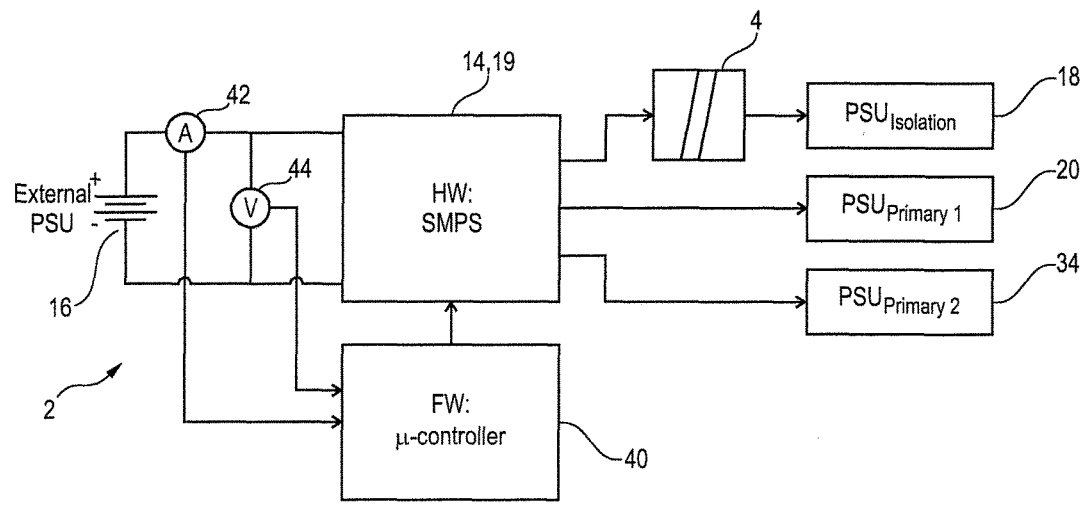
FIG. 1 shows a power supply.

FIG. 1 shows a power supply which power supply comprises at least a first transformer 4 which transformer is connected to a first power supply 18. A hardware unit which comprises an excitation circuit and a discharge control circuit. This hardware control system is controlled by a microcontroller 40. The combined excitation circuit and discharge control circuit 14,19 is further connected to a second power supply 30 and to a third power supply 34. The microcontroller 40 is receiving input signals at least from a measuring circuit 42 which is able to measure current coming from the external power source 16 and the measuring device 44 performs measurement of the voltage. All information is transmitted to the microcontroller 40. In that way, it is possible for the microcontroller to control different switches in the hardware combined excitation circuit and discharge control circuit. Hereby it is possible from the power source 16 to deliver power for three power supplies. The power supply that is supplied to the transformer 4 is galvanic isolated to the rest of the circuit. Because of the transformer 4 the first power supply 18 can have a voltage that is different from the voltage of the two other power supplies 20,34. The voltage is mostly depending on the ratio of windings in the transformer.

Figure 2:
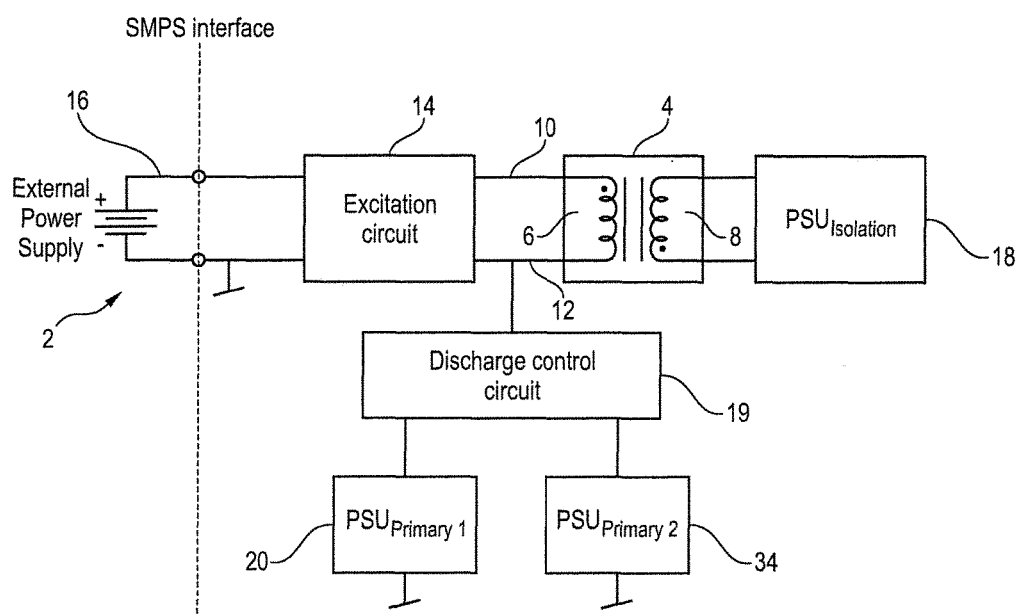
FIG. 2 discloses a system overview.

FIG. 2 discloses a system overview. Here is indicated the transformer 4 has a primary winding 6 and a secondary winding 8. The primary transformer has a line 10 and a line 12 connected to the excitation circuit 14. Further is a line 12 connected to the discharge control circuit 19. The discharge control circuit 19 is further connected to the power supply 20 and to the power supply 34. The FIG. 2 power supply is also connected to a power source 16.

Figure 3:
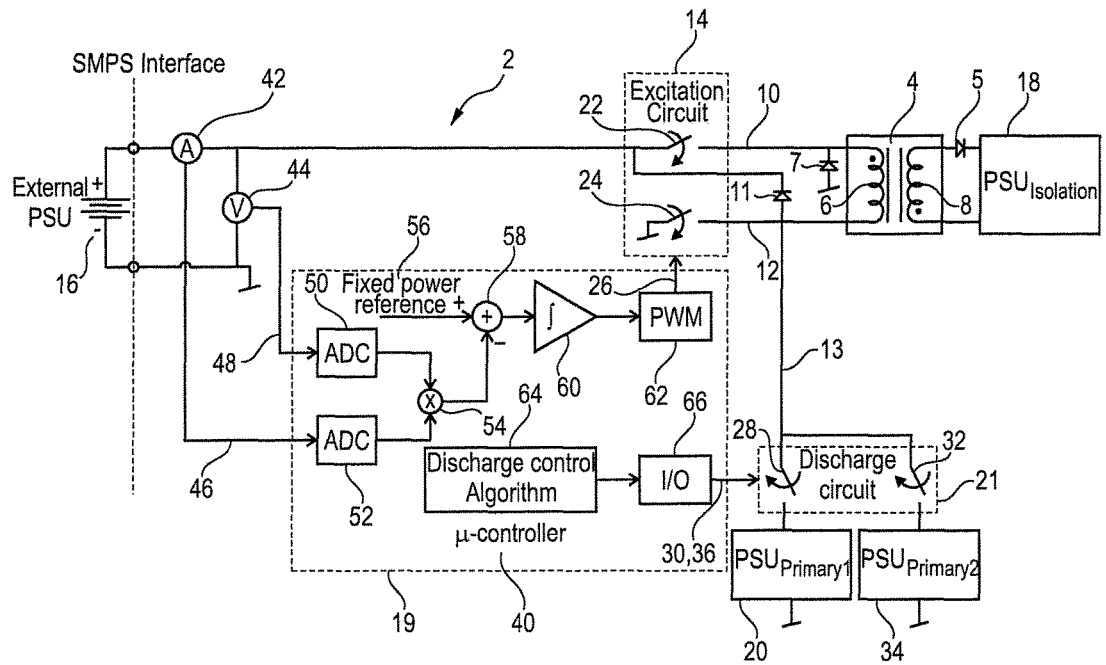
FIG. 3 discloses a more detailed diagram of one possible embodiment for the power supply.

FIG. 3 discloses a more detailed diagram of one possible embodiment for the power supply 2. Once again the transformer 4 is indicated with a primary side 6 and a secondary side 8. A diode 5 is rectifying current delivered at the secondary side of the transformer 4 before the current is transmitted to the power supply 18. The lines 10 and 11 are connected to the excitation circuit 14, which excitation circuit 14 comprises switches 22, 24. From the excitation circuit 14 there is a connection towards the power source 16. From the line 12 connected to the switch 24 and to the primary side of the transformer 6, is a line 13 connected to a discharge circuit 21. This discharge circuit comprises switches 28 and 32. The switch 28 is connected to the power supply 20, where the switch 32 is connected to the power supply 34. The discharge circuit 21 is under control of a circuit 19, which is a discharge control circuit. This circuit comprises a microcontroller 40, which microcontroller 40 is receiving a signal from a current measuring 42 and a voltage measuring 44 through lines 46, 48 towards analogue to digital converters 50, 52. The two digital signals are then multiplied in a multiplication unit 54, before the signal is subtracted in unit 58, where a fixed power reference 56 is used as a reference. The resulting signals from the subtraction unit 58 are sent to an integrator 60, which integrator 60 controls a PWM modulation circuit 62. From here a line 26 goes to the excitation circuit 14 so that the pulse width modulation signal 26 is used to control the switches 22 and 24. The microcontroller 40 further comprises a discharge control algorithm 64, which is connected to an input/output unit 66 for generating control signals 30 and 36 for control of the discharge circuit 21 and the switches 28 and 32.

Figure 4:
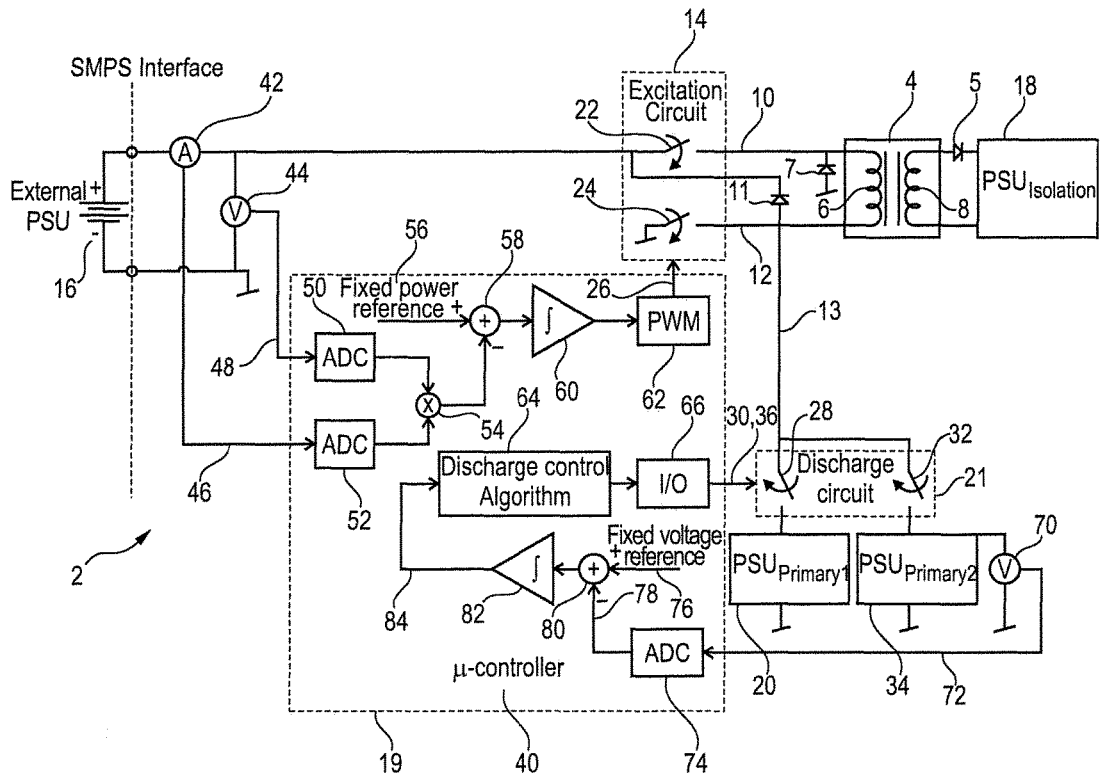
FIG. 4 shows a first alternative embodiment of the power supply.

FIG. 4 shows an alternative embodiment where most of the elements indicated at FIG. 4 is identical to what is shown at FIG. 3. Therefore, where identical items are not described under FIG. 4, instead description can be found in the text relating to FIG. 3.

The difference to what is indicated at FIG. 3 starts by a measuring device 70 that is performing voltage measuring at the input at the power supply 34. This voltage measuring device delivers a signal 72, which signal is transmitted to an analogue to digital converter 74. By line 78 is that signal now in digital form transmitted to a subtraction unit 80, where a fixed voltage reference signal 76 is subtracted from the signal 78. The resulting signal is afterwards sent to an integrator 82 before the signal via line 84 is transmitted to the discharge control algorithm 64. The discharge control algorithm 64 is known from FIG. 3 and is therefore not further described.

In operation will the invention shown as FIG. 4 be able to perform a highly effective voltage regulation of the power supply 34. Therefore, in FIG. 4 one feedback is controlling the excitation circuit 14 where the discharge control algorithm has an input depending on the voltage 70 measured at the second power supply 34.

Figure 5:
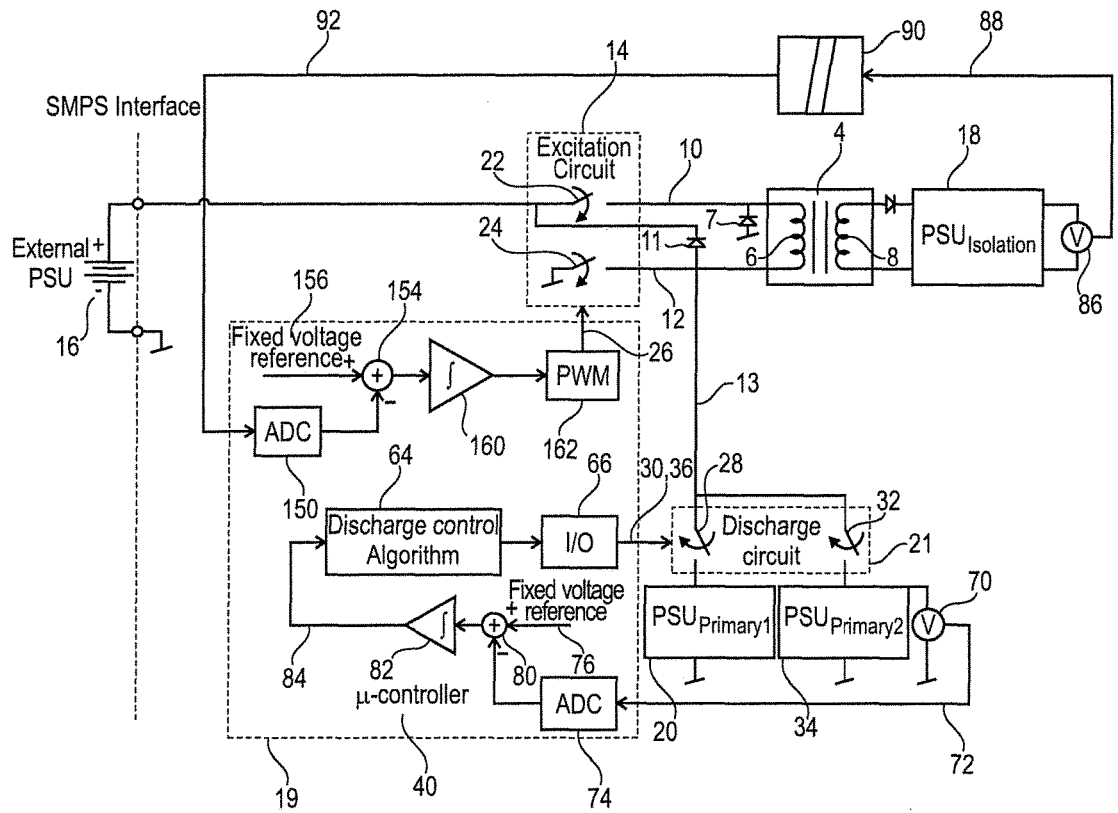
FIG. 5 shows a second alternative embodiment of the power supply.

FIG. 5 also concerns many common features to FIG. 3, therefore these features are not mentioned again relating to FIG. 5. The difference between FIG. 5 and FIG. 3 is that a voltage measurement 86 is performed at the first power supply 18. The measurement of the voltage is transmitted over a line 88 to a galvanic isolation 90 which could be performed as an optical device further into a line 92 which line leads to an analog to digital converter 150. From here a digital signal is transmitted for subtraction unit 154 where the input value is subtracted from a fixed voltage reference 156. Afterwards, the resulting signal is sent to an integrator 160 before the signal is transmitted to a pulse width modulator 162. From the pulse width modulator 162 the signal is transmitted to line 26 and the rest of the function is described relating to FIG. 3.

Figure 6:
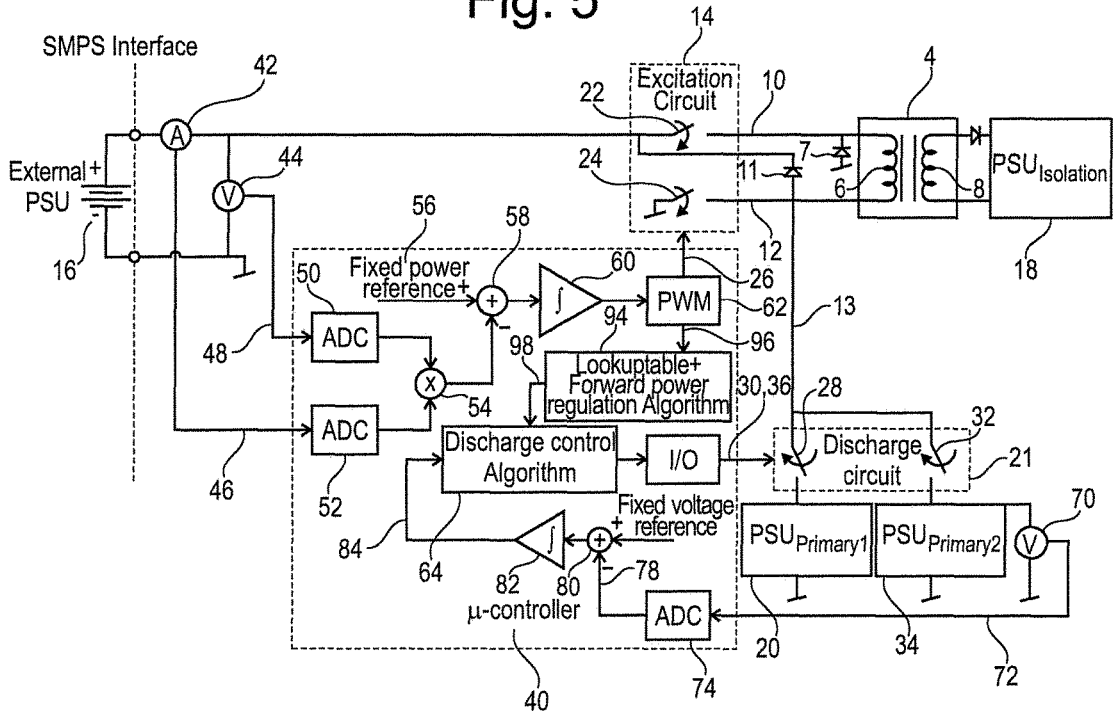
FIG. 6 shows a second alternative embodiment of the power supply.

FIG. 6 discloses mostly the same features as already mentioned as FIG. 4. Therefore, only differences to FIG. 4 will be mentioned. The PWM modulator 62 has a further output 96 which is sending information related to the pulse width modulation to a lookup table and is used in a forward power regulation algorithm 94. From here the communication line 98 transmit a signal to the discharge control algorithm 64. Hereby is achieved that the discharge control is made in accordance with the pulse width modulation of the excitation circuit. Because there is an input to the system from the input voltage and the input current, it is possible for the system to control the input power from the power source 16 and by active influence of the excitation circuit the power consumption can be controlled. But, by letting the PWM modulation be used for the lookup table and forward power regulation algorithm a feed forward to the discharge control and to the discharge circuit and the switches 28 and 32 can be made. Hereby can an extremely fast regulation can be performed.

Figure 7:
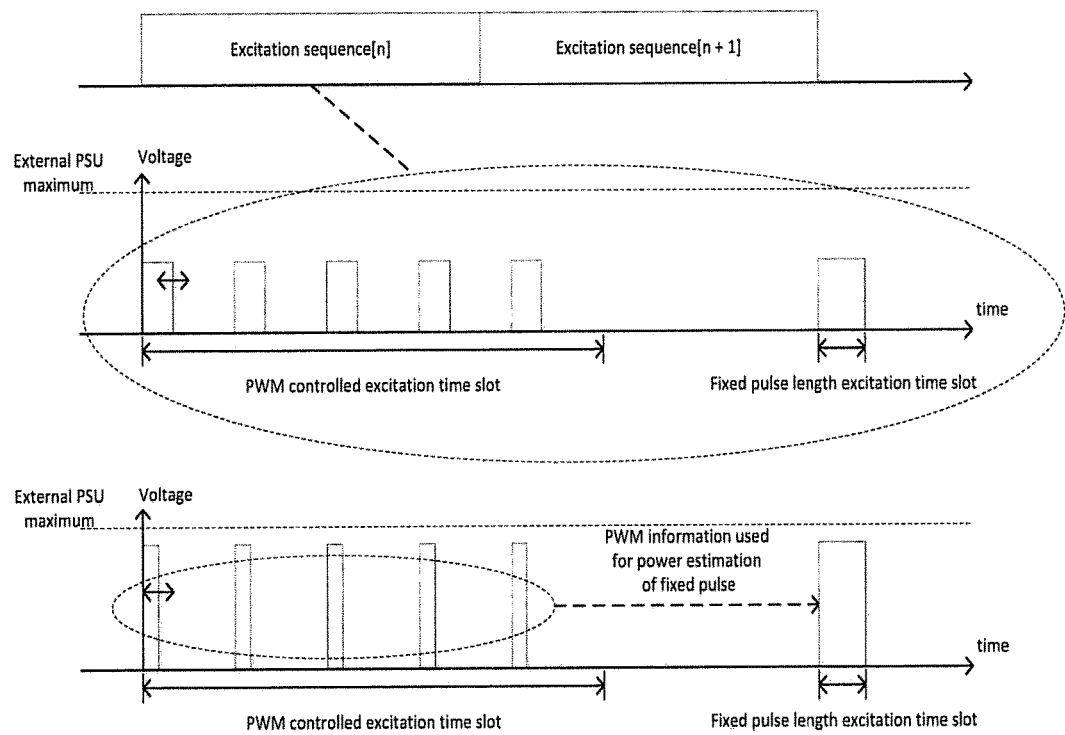
FIG. 7 shows an excitation scheme according to the invention.

FIG. 7 shows an example of an excitation scheme.

What is claimed is:

1. Power supply, comprising:
    at least one first power supply,
    at least one second power supply,
    a power source,
    at least one excitation circuit that is adapted to be connected to the power source,
    a discharge control circuit connected to the at least one second power supply,
    a transformer having at least one primary winding and at least one secondary winding, the primary winding being galvanically isolated from the secondary winding and being connected by a first and a second line to the at least one excitation circuit, and secondary winding being connected to the at least one first power supply, whereby a line connected to the primary winding is further connected to the discharge control circuit,
    wherein the at least one second power supply comprises a voltage measurement device which controls power supply voltages by means of voltage measuring devices, the output of which is fed to the discharge control circuit, wherein a first processor is connected to the voltage measuring devices, the voltage measuring devices being adapted to transmit signals representing current and voltage measured at the power source.

2. Power supply according to claim 1, whereby the excitation circuit (14) comprises a first (22) and a second (24) electronic switch, which first and second electronic switch (22,24) performs connection and disconnection of the power supply (16), which first and second switch (22,24) is controlled by a first control signal (26).

3. Power supply according to claim 2, whereby the discharge control circuit (19) comprises at least a third electronic switch (28), which the third electronic switch (28) is connected to the second power supply (20), which the third electronic switch (28) is controlled by a second control signal (30).

4. Power supply according to the claim 3, whereby the discharge control circuit (19) comprises at least a fourth electronic switch (32), which fourth electronic switch (32) is connected to a third power supply (34), which fourth electronic switch (32) is controlled by a third control signal (36).

5. Power supply according to the claim 4, wherein the control signals (26, 30, 36) are generated from at least the first processor (40).

6. Power supply according to the claim 5, whereby the first processor (40) performs optimum power tracking based on data representing voltage (48) and current (46).

7. Power supply according to the claim 6, whereby the second power supply (20) is controlled for generating a mostly constant voltage.

8. Power supply according to the claim 7, whereby the third power supply (34) is controlled for generating a mostly constant power.

9. Power supply according to the claim 8, wherein the processor (40) is adapted for performing digital filtration of power passing any of the switches (28,32) in the discharge circuit (19).

10. Power supply according to the claim 9, whereby input from the input voltage (44) and the input current (42) controls the PWM modulation (62), which PWM modulation (62) is used for a lookup table for a forward power regulation algorithm (94), which forward power algorithm (94) generates a feed forward to the discharge control algorithm (64) and to the discharge circuit (21).

11. Method for operating a power supply having at least one first power supply,
at least one second power supply,
a power source, at least one excitation circuit that is adapted to be connected to the power source, a discharge control circuit connected to the at least one second power supply, a transformer having at least one primary winding and at least one secondary winding, the primary winding being galvanically isolated from the secondary winding and being connected by a first and a second line to the at least one excitation circuit, and the at least one secondary winding being connected to the at least one first power supply, whereby a line connected to the primary winding is further connected to the discharge control circuit, the method comprising at least the following sequence of steps:

A: connect the primary winding of the transformer to the power source,
B: disconnect the primary winding,
C: let the secondary winding charge the first power supply,
D: repeat connection of the primary winding to the power source,
E: disconnect the primary winding and close a switch in the discharge control circuit to charge the second power supply,
F: connecting a first processor to the at least one second power supply and to at least one voltage measuring device of the at least one second power supply,
G: transmitting output signals representing current and voltage measured at the power source from the at least one voltage measuring device,
H: using the output signals of the at least one voltage measurement device to control power supply voltages by feeding the output signals of the at least one voltage measurement device to the discharge control circuit, and
I: Repeat the sequence of steps A-H in dependence of actual power demand in the power supplies.

* * * * *